(12) United States Patent
Stephens et al.

(10) Patent No.: US 8,249,732 B2
(45) Date of Patent: Aug. 21, 2012

(54) SYSTEM AND METHOD FOR DEVELOPING AUTOMATED TEMPLATES FOR KNOWLEDGE CAPTURE

(75) Inventors: James C. Stephens, Bellevue, WA (US); Raymond Kok, East Windsor, NJ (US); Michelle Lund, Bellevue, WA (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 541 days.

(21) Appl. No.: 12/491,982

(22) Filed: Jun. 25, 2009

(65) Prior Publication Data

US 2009/0326694 A1 Dec. 31, 2009

Related U.S. Application Data

(60) Provisional application No. 61/075,924, filed on Jun. 26, 2008.

(51) Int. Cl.
*G06F 19/00* (2006.01)

(52) U.S. Cl. ............................ 700/98; 700/104; 345/419

(58) Field of Classification Search .................... 700/98, 700/104–105; 716/103; 703/14–15; 345/419–420
See application file for complete search history.

(56) References Cited

U.S. PATENT DOCUMENTS

| | | | |
|---|---|---|---|
| 6,230,066 B1 * | 5/2001 | Sferro et al. | 700/104 |
| 7,007,261 B1 * | 2/2006 | Ballagh et al. | 716/103 |
| 7,280,948 B2 * | 10/2007 | Duggirala | 703/7 |
| 7,386,814 B1 * | 6/2008 | Stroomer et al. | 716/103 |
| 7,685,541 B1 * | 3/2010 | Stroomer et al. | 716/103 |
| 2005/0209722 A1 * | 9/2005 | Kok et al. | 700/105 |

FOREIGN PATENT DOCUMENTS

| | | |
|---|---|---|
| EP | 1225524 A2 | 7/2002 |
| EP | 1351170 A2 | 10/2003 |
| EP | 1585039 A2 | 10/2005 |
| EP | 1684201 A2 | 7/2006 |

OTHER PUBLICATIONS

Altmeyer, et al. Published in IEEE/ACM International Conference on Computer-Aided Design, Digest of Technical Papers (ICCAD), Nov. 6, 1994 (pp. 754-761); Magazine.

* cited by examiner

*Primary Examiner* — Charles Kasenge
*Assistant Examiner* — Douglas Lee (57) ABSTRACT

A system, method, and computer program product for automated development of templates for knowledge capture for use in computer aided design and manufacturing. A method includes receiving a user selection of one of a plurality of parts to be developed into a product template. The method also includes receiving data about the selected part, the data including a plurality of part components. The method further includes displaying parametric data relating to the part components and connections between the part components. The method still further includes receiving customizations to the parametric data from the user. The method also includes developing program code based on the customizations to the parametric data. The method also includes publishing the program code and the customized parametric data as the product template.

20 Claims, 6 Drawing Sheets

SYSTEM AND METHOD FOR DEVELOPING AUTOMATED TEMPLATES FOR KNOWLEDGE CAPTURE

CROSS-REFERENCE TO OTHER APPLICATION

This application claims priority from U.S. Provisional Patent Application 61/075,924, filed Jun. 26, 2008, which is hereby incorporated by reference.

TECHNICAL FIELD

The present disclosure is directed, in general, to computer-aided design, manufacturing, and visualization systems, collectively described as CAD systems herein.

BACKGROUND OF THE DISCLOSURE

The capture of knowledge or reuse of design intent in computer aided design (CAD) is becoming increasingly difficult with more sophisticated models and modeling techniques.

SUMMARY OF THE DISCLOSURE

Disclosed embodiments include a system, method, and computer program product for automated development of templates for knowledge capture for use in computer aided design and manufacturing method. An exemplary method includes receiving a user selection of one of a plurality of parts to be developed into a product template. The method also includes receiving data about the selected part, the data including a plurality of part components. The method further includes displaying parametric data relating to the part components and connections between the part components. The method still further includes receiving customizations to the parametric data from the user. The method also includes generating program code based on the customizations to the parametric data. The method also includes publishing the program code and the customized parametric data as the product template.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Attempts to solve the problem of knowledge capture and reuse have centered on writing program code in either a traditional knowledge based engineering (KBE) language or in some other graphically-oriented programming language. This requires special skill as a programmer that is not typically found in the person who has the knowledge of the design of a given part. Also, such code development programs are complex and the maintenance and support costs for each program are very high.

The use of parametric templates, in most cases, focuses on the use of programming languages without an effective reuse of existing parametric CAD models. The reliance on programming has severely limited the scope of what could be accomplished, especially in light of the very high maintenance cost associated with each corresponding system. In the traditional approach, the program code or system developed is separate from the CAD part itself and so a user has two repositories of data to manage and keep in sync. This presents additional problems for data management and version control.

The benefit of knowledge based engineering (KBE) has been limited because the ability to use the traditional KBE tools and other relevant tools requires special skills and programming knowledge. In order to have an effective process for knowledge reuse, it is important to include those designers and engineers who capture the real design and engineering intent in parametric CAD models.

A system, method, and computer program product as disclosed herein enables a designer to capture the design intent and knowledge base behind a design and automatically generate the program code to implement a product template. This template can then be used by a CAD system such as the NX® product by Siemens Product Lifecycle Management Software Inc., or others. The CAD system then manages and helps the user use the template.

The product templates are essentially a documented representation of any kind of CAD part data that the original author of the part data wants to promote for reuse across a much broader user community. In order to add the necessary explanatory context to the CAD part data, a product template is created and published. Once the template author has published the product template, other CAD users will be able to use the product template as a logical building block of their specific design. The product template can either serve as the building block for a new design or as one of the logical pieces that can be added to an existing design.

One benefit of this approach is the ability to capture knowledge and design reuse without requiring a user to write or develop programming code. The user simply drags and drops CAD features, expressions, objects and components into the template. The template authoring environment determines the type of knowledge to be captured based on the type of feature, expression, object or component that is dropped. A series of entry panels guide the author through the steps to set up and preview the template. The template contains both an automatically generated user interface plus the behavioral code that can drive and change the model. It also allows the author to embed help files, images or other text materials into the template. The author can then "publish" the template which generates all of the code needed for the template and embeds that code into a CAD part file.

Figure 1:
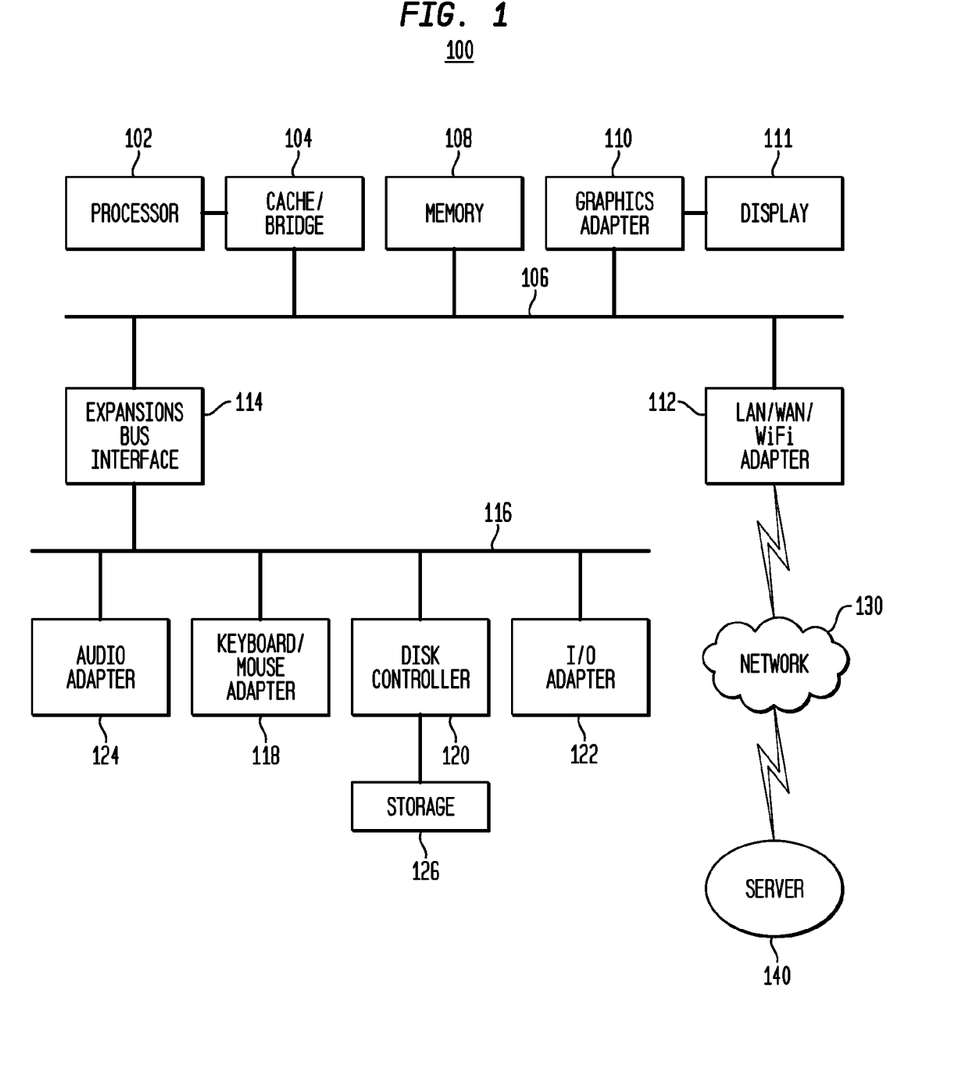
FIG. 1 depicts a block diagram of a data processing system capable of implementing a system in accordance with a disclosed embodiment.

A process for developing and using product templates, such as the embodiment found in the Product Template Studio product by Siemens Product Lifecycle Management Software Inc., is performed by a properly configured data processing system. FIG. 1 depicts a block diagram of a data processing system capable of implementing a system in accordance with a disclosed embodiment. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, track pointer, etc.

Those of ordinary skill in the art will appreciate that the hardware depicted in FIG. 1 may vary for particular embodiments. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Figure 2:
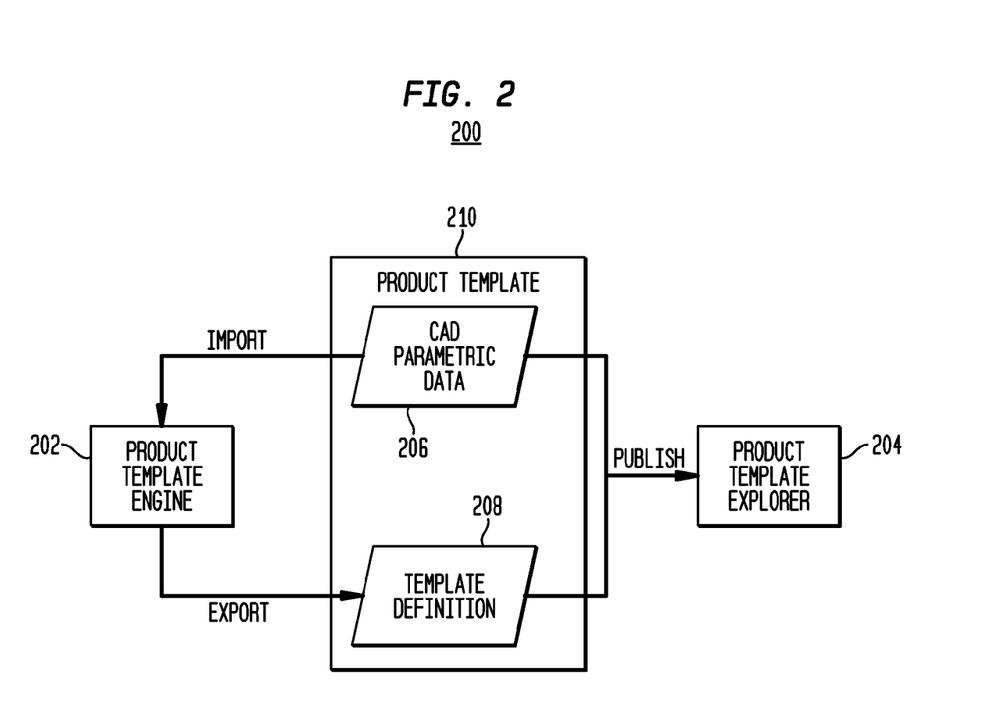
FIG. 2 depicts key components of a product template suite, according to one advantageous embodiment.

FIG. 2 depicts the key components of a product template suite 200, according to one advantageous embodiment. Product template suite 200 includes two main modules, a product template engine 202 and a product template explorer 204. Product template engine 202 allows CAD system users to graphically develop CAD parametric data 206 and the template definition 208. Together, the parametric data 206 and the template definition 208 make up the product template 210. Product template explorer 204 then allows CAD system users to use any product template, such as product template 210, that has been published by product template engine 202. Those skilled in the art will recognize that the embodiment of product template suite 200 shown in FIG. 2 is just one example. Other embodiments, having additional or other components, may be possible.

Product template engine 202 includes the main tools used to automatically generate the code needed for knowledge capture and design reuse. A user of product template engine 202 can modify expressions, features, and components of the template. Then product template engine 202 automatically generates program code without the user having to program the code by means of a KBE or other programming language.

This differs from a traditional programming approach of starting at the bottom with user interface elements or programming tools and developing the code to drive the expressions and components. Product template engine 202 also allows a user to develop a product template in a small fraction of the time it would take to do the same thing in a traditional approach. Additionally, the captured knowledge is embedded in the part; therefore the user has only a single object to track. Knowledge rules are always in synchronization with the corresponding parametric content of the CAD part file.

Product template engine 202 can also be used to make changes to captured knowledge in existing templates. Changes to captured knowledge in an existing template are accomplished using a process similar to the creation of a new product template. The process is much faster than going back to change hand written code. This reduces maintenance costs for a template since the template is captured at a high level, not in a low level programming language.

Product template engine 202 offers several advantageous features. For example, to add a slider bar to a GUI for an expression in traditional programming languages, a user would need to have significant programming knowledge to set up and enable the slider bar to be useful to an end user. In product template suite 200, the user only needs to know the expression itself, and how it is variable. Product template engine 202 will build and program a slider, including all underlying program code, based on the parameters of the expression. Product template engine 202 is designed to be used by an engineer or manufacturing designer, not a programmer.

The presentation options in product template engine 202 are not just limited to a slider or simple text entry. Other graphical interaction techniques are also supported. For example, a linear dimension could be adjusted by dragging a handle in the graphics area. In certain embodiments, the system recognizes the type of expression to be modified, and will offer appropriate presentation options. For example if the parametric expression is a vector, then the user interface choices will be appropriate for creation of a vector. Some of the other options for display include the option menu, selection from a list of choices, toggle button, check box (on/off or yes/no type), linear or angular dimension, and read only text display for values that the user wants to see, but not modify.

Product template engine 202 automatically determines the type of knowledge to capture based on a particular type of modeling entity such as the feature, expression or component. Product template engine 202 determines the actions and behaviors that are appropriate to capture the knowledge and allow reuse of the feature, expression, object or component. Based on those determinations, product template engine 202 automatically generates the code needed for knowledge capture and reuse. This includes modification of parametric values, the definition of the user interface, requirement checks for valid inputs and outputs, management of inter-part links and dependency management. Design knowledge is embedded in the CAD part file. This means only a single file for the user to manage and configure.

In certain embodiments, Product template engine 202 may automatically generate several categories of program code. One category is code for generation of the dialog and dialog elements. This may include basic code to support the dialog and specific code for each element in the dialog (e.g., sliders, option menus, check boxes, buttons, etc.). Another category is initialization code for the dialog. This code provides the connection between the part and the dialog to read the current values from the part or component and appropriately display those values in the dialog elements.

Another category of generated code may include requirement and checking support code. This code may be needed to validate inputs from a user or values that are derived from user entries. For example, a user might enter a length of an object, then the requirement check validates that the overall weight of the object is still within a range. The generated code also provides the interface to the reporting mechanism for tracking and displaying the results of the checks. Code may also be generated to support user interface visibility and sensitivity. This code governs relationships between user interface elements so that item visibility or sensitivity can be controlled as appropriate for interaction with the template. For example, if a part template allows an option of having vent holes or not, then the input items for the size of the holes can be displayed or hidden, depending on the option chosen.

In certain embodiments, another category of automatically generated code is update code that takes a user input from a dialog element, formats it in the appropriate manner and applies it to the expression, feature or component that is being controlled. Another category of code is help code that controls the display of help pages, context sensitive help windows, or other help functionality required by the type of parametric data used in the template interface.

Product template engine 202 features an easy to use environment for review of the parts that will be authored into a template. The environment includes a graphical viewer of the part, the features and expressions in the part. Within the environment, an author can also view which parts in an assembly have associated templates, and the inter-part relationships between the templates in the assembly. Product template engine also allows the author to preview the generated user interface for the template.

Product template engine 202 supports a modular design where template assemblies can be created from individual template parts. As a user builds up an assembly from various components or sub assemblies that are templates, the knowledge reuse is automatically integrated and available in the assembly. Product template engine 202 also features a library mechanism which allows the user to classify and store CAD templates in a convenient way for reuse; the management of templates can either be done based on native file storage or through a dedicated product lifecycle management (PLM) system.

The structure of product template 210 will generally be independent from the corresponding assembly structure. In other words, if an assembly structure includes a number of different components, it will be up to the user to decide which components from the assembly in this case are important enough for the user to include in the definition of product template 210. For example, some standardized parts, like certain screws or fasteners, may not require the definition of a product template. In some embodiments, there may be only a few components of the complete CAD assembly which need to be visited in order to drive the corresponding parametric model.

Figure 3:
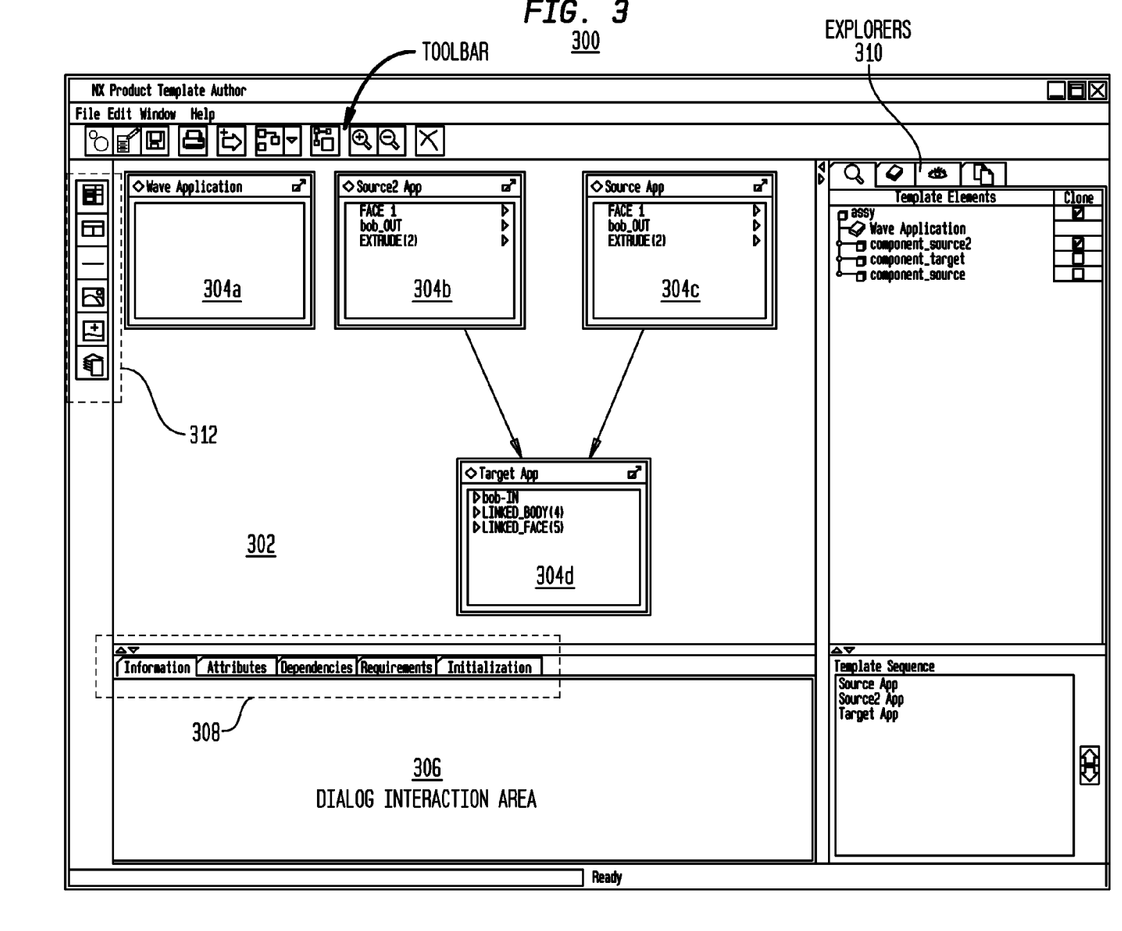
FIG. 3 depicts a primary work area of a product template engine, according to one embodiment of the present disclosure.

FIG. 3 depicts a primary work area 300 of product template engine 202, according to one embodiment of the present disclosure. As described earlier, the system is able to read in CAD parts and assemblies, author the template data, and publish the authored data into the CAD part files. In certain embodiments, product template engine 202 is a standalone application written in the Java™ programming language of Sun Microsystems, Inc. However, it is contemplated that the system may be developed in languages other than Java™.

The primary work area 300 includes a workbench area 302. Workbench area 302 is a scrollable region much like a Multi Document Interface. Workbench area 302 shows each template component 304a-304d for a product template and any relationships or connections between the components. Opening a particular template component will allow the user to interact with the user interface definition for the template component and interact with a set of panels to customize the interface.

A dialog interaction area 306 is included below workbench area 302. The dialog interaction area 306 includes a number of tabs 308. The content of these tabs is dependent on what has been selected on workbench area 302. The Information tab shows error messages and information display as a text area. The Attributes tab allows the author to view and change attributes specific to a product template feature, or to manipulate connections between template components. The Dependencies tab allows the author to view and change dependencies for visibility, sensitivity and component suppression. The Requirements tab gives the author the ability to view and change requirements on numeric expressions or CAD checking requirements on a template component. The Initialization tab permits the user to view and change initialization settings for a template component.

The environment also includes a number of explorers 310 to help with visualization and interaction with the template. The Template Explorer shows the overall structure of templates components in the product template, controls template naming and which assembly components will be cloned or referenced. The File Explorer shows the current file system and can be used to add components to the product template assembly. The Model Explorer allows a three-dimensional display of the CAD model and contains the feature and assembly browser. The Dialog Explorer shows the layout of the template interface as it would appear in the CAD system as a block dialog. A mouse click on the appropriate icon on the tab in the explorers window 310 reveals a particular explorer.

Figure 4:
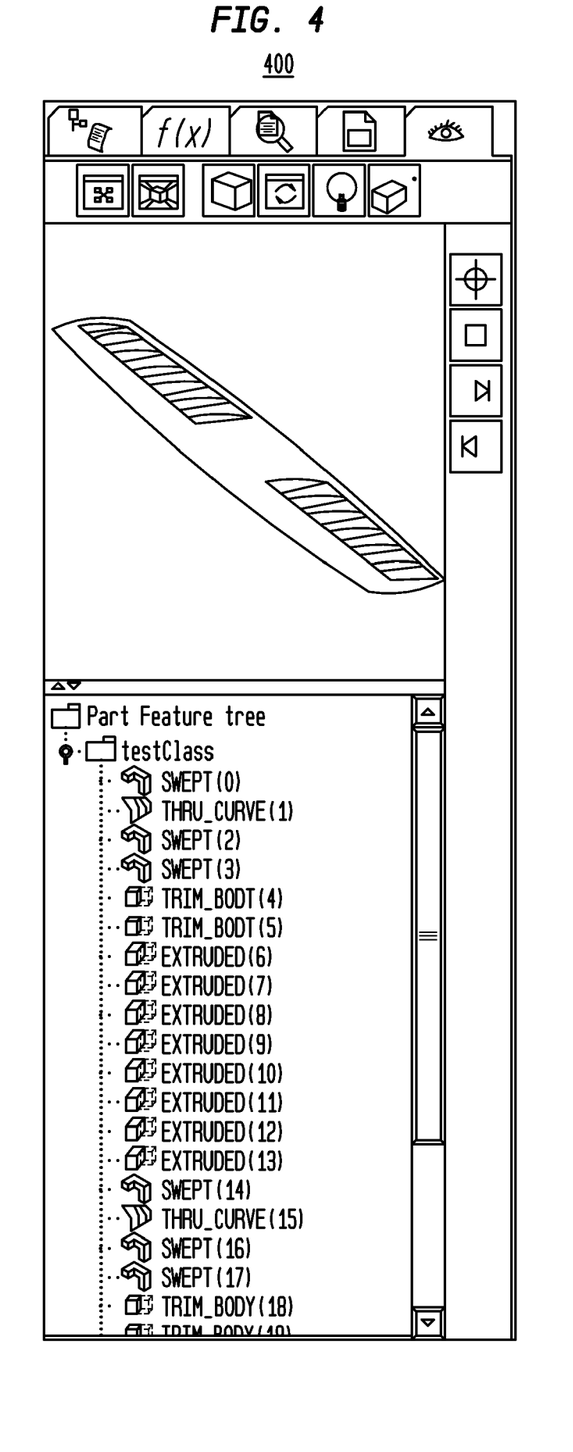
FIG. 4 depicts a graphical viewer of CAD model data that is incorporated into a Model Explorer, according to one advantageous embodiment.

FIG. 4 depicts a graphical viewer 400 of CAD model data that is incorporated into the Model Explorer, according to one advantageous embodiment. The functionality of the graphical viewer will allow the user to visualize the CAD model. Operations like shaded or wire frame display, rotate, zoom, translation, and highlighting are supported. In some embodiments, such features may be achieved by certain combinations of keyboard presses, mouse moves and mouse clicks.

The main interaction with the user interface for a template component is by expanding one of the template components 304a-304d found on workbench area 302. This will display a tree showing the various elements, or product template features, in the user interface. In certain embodiments, tools are provided to get information about elements in the tree, remove elements in the tree, or reorder the elements. In some embodiments, a set of tools may support the workbench interactions. These tools may include connection arrow display functions, zoom in and out, and print.

Dialog interaction area 306 supports interaction and customization of the user interface. Most user interface elements or product template features are created by using drag and drop of expressions, sketches, features and other elements from the Model Explorer into the template component. Additional product template features can be created by drag and drop of other tools from the resource bar 312 along the left side of primary work area 300. These tools include buttons, labels, separators, groups and other user interface elements that are not directly related to model geometry.

Product template engine 202 supports print functions that allow the user to print the workbench or the dialog panels for documentation of the template components. In certain embodiments, product template engine 202 includes user definable sounds for drag and drop, errors and warnings. Product template engine 202 may also have option settings to allow the user to customize the look and feel of the author environment.

In some embodiments, product template engine 202 includes an option to generate a connection report. A connection report provides information about connections between components in the template. In some embodiments, there are two types of connections between template components that are tracked by the system. Static connections include inter-part expressions that already exist in the assembly when it is imported into product template suite 200. Dynamic connections include connections created at runtime in the consumer environment in the CAD system. The connections report can contain both the dynamic connections that would be created within the CAD system, and the existing static connections for inter-part expressions. The content of the report is controlled by the previous radio options for which types of connections to display on the workbench.

A product template can incorporate other product templates as a part of a modular design. In other words, product template suite 200 supports a template with an assembly structure where one of the components in the assembly is itself a product template and, therefore, has its own set of template components. A template within a template may be called a child template or subordinate template. The template that includes the child template may be called a parent template or main template. Once a parent product template has been opened in the system, the author can add a child template to the assembly by using drag and drop from the File Explorer.

Figure 5:
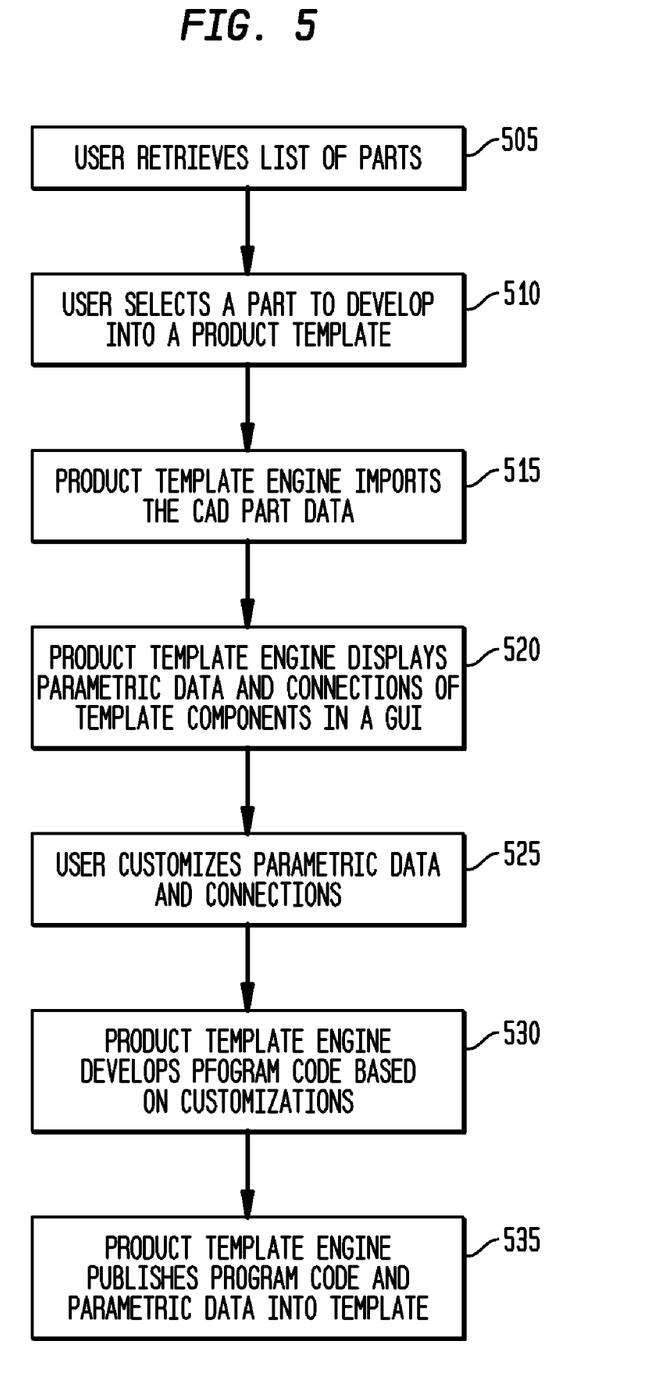
FIG. 5 depicts a process for creating product templates, according to one embodiment of the present disclosure.

FIG. 5 depicts a process for creating product templates according to one embodiment of the present disclosure. Such a process may be performed, for example, in product template engine 202 or in a suitably configured data processing system. First, a user retrieves a list of CAD part data that are stored in the product template engine (step 505). The CAD part data can represent many types of parts. For example, the part data can include a single component, an assembly, a part family, or any combination of these different forms of CAD part data. It will be apparent to one skilled in the art that the data typically includes parametric data that can be used to parametrically update the corresponding geometry.

Next, the user selects one of the parts from the list to be developed into a product template (step 510). The product template engine receives the user selection and imports the selected CAD part data, which will allow the user to control both the structure and user interface for the template components of the selected part (step 515). In certain embodiments, importing the CAD part data includes loading the data from a data base into memory. In other embodiments, the CAD part data may be received over a network or from another source.

Next, the product template engine displays the template components in a graphical user interface (GUI). The GUI allows the user to access the parameters relating to each template component, as well as the connections between different components (step 520). The user then customizes the parameters and connections (step 525). The product template engine allows the user to graphically define the composition of the product template and the definition of the user interface for each template component. Based on the customizations provided by the user, product template engine develops program code to allow a later user to interact with the customized product template (step 530).

Finally, the product template engine publishes the customized template information, including all customized parameters and code, into the corresponding CAD part files (step 535). This means that affected CAD part files do not have any additional dependency on secondary data files which describe the operation of the part file. A user of a CAD system will only have to consult the CAD part files in case the user wants to import, export or run the product as part of their CAD session.

It will be apparent to those of skill in the art that the process described above is for example purposes and should be construed to limit the disclosure in any way. The process can be modified in other embodiments by adding steps, repeating steps, or removing certain steps, as discussed below. Also, while the exemplary process is performed in a particular CAD environment, it should be clear to those skilled in the art that the process could be performed in other environments.

Figure 6:
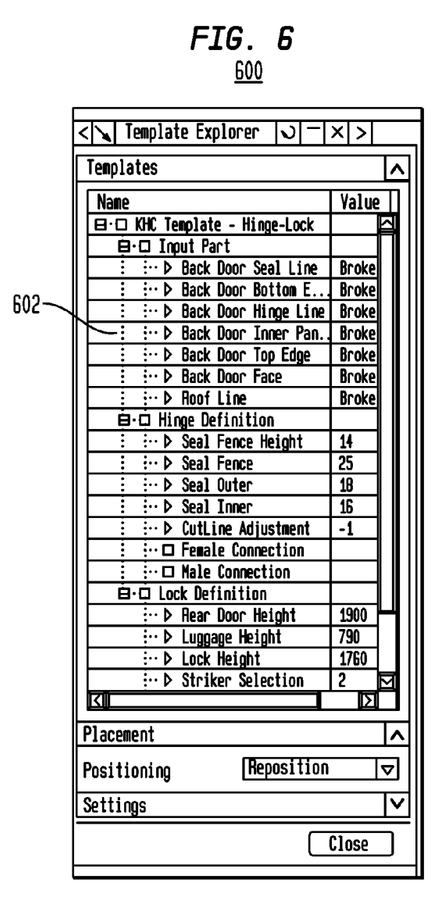
FIG. 6 depicts a view of a product template explorer, according to one embodiment of the present disclosure.

FIG. 6 illustrates a view of a user interface for product template explorer 204, according to one embodiment of the present disclosure. Product template explorer 204 provides a simple interface for an assembly of parts, using templates created in product template engine 202.

A user starts product template explorer 204, for example, by selecting and dragging one of the template assemblies into a new part in the CAD system. This causes the product template file to be added as a component to the current work part. Other methods for launching product template explorer 204 are possible. When the component has been added, the product template explorer dialog 600 appears. The structure of the product template is displayed in a tree control 602. The user can then begin editing the assembly using the template and its corresponding parametric data. By using templates created in product template engine 202, a user will find it much easier to create and edit an assembly than by using standard methods.

Figure 7:
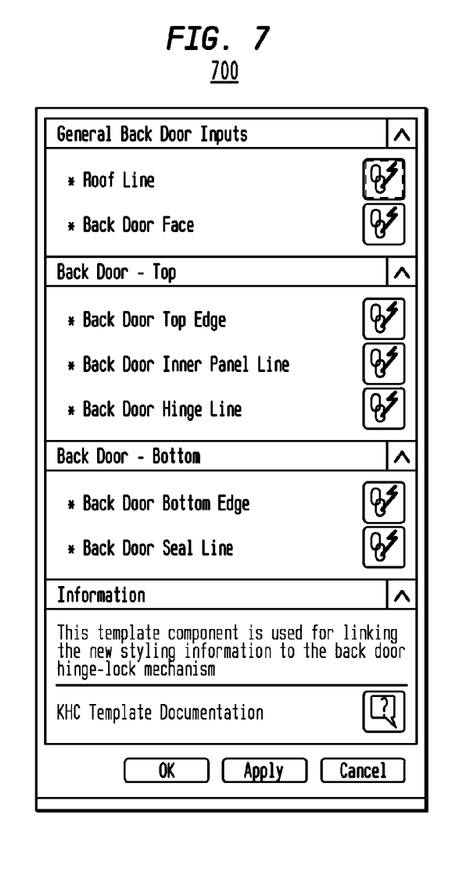
FIG. 7 depicts a sample product template component dialog in a product template explorer, according to one embodiment of the present disclosure.

In the product template explorer dialog 600, the user can select any product template component to bring up the dialog for that component and edit the parameters. A sample product template component dialog 700 is shown in FIG. 7. In some embodiments, all template components are available for editing at all times. In other embodiments, certain restrictions may be enforced. The contents of the product template explorer dialog 600 can be defined by the author. In the product template explorer dialog 600, if the user expands the node for a product template component, then the input and output parameters for that component will be shown in the tree. If the user turns off the "Show Parameters" in the Settings block of the dialog, then the parameters will not be shown in the tree.

In certain embodiments, the user will be able to use several different positioning methods to reposition the component containing the product template in its parent assembly. In some embodiments, the user may clone the original template in order to work with a copy of the template data, rather than the original template.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for creating a configurable product template to be used in a data processing system implementing a computer aided design (CAD) environment, the method comprising:
   receiving, in a data processing system, a user selection of one of a plurality of parts to be developed into a product template;
   receiving, by the data processing system, data about the selected part, the data including a plurality of part components;
   displaying, by the data processing system, parametric data relating to the part components and connections between the part components;
   receiving, by the data processing system, customizations to the parametric data from the user;
   generating, by the data processing system, program code based on the customizations to the parametric data, the program code including requirement and checking support code that validates values that are derived from user entries; and
   publishing the program code and the customized parametric data into the product template and storing the product template in the data processing system.

2. The method of claim 1, wherein the generated program code validates an input from a user.

3. The method of claim 1, wherein the generated program code reads a current value from one of the part components and displays the value in a dialog element.

4. The method of claim 1, further comprising:
   displaying in a graphical viewer a three-dimensional model of the selected part.

5. The method of claim 1, wherein the product template is configured to
   allow a user to:
   retrieve the product template;
   edit parameters of the product template; and
   use the product template to create an assembly of parts based on the product template and the edited parameters.

6. The method of claim 1, wherein the connections between the part components comprise at least one of a static connection and a dynamic connection.

7. The method of claim 1, wherein the product template is a parent template and the parent template comprises a child template.

8. A data processing system comprising a processor and an accessible memory, the data processing system configured for creating a configurable product template to be used in a computer aided design (CAD) environment by performing the steps of:
- receiving a user selection of one of a plurality of parts to be developed into a product template;
- receiving data about the selected part, the data including a plurality of part components;
- displaying parametric data relating to the part components and connections between the part components;
- receiving customizations to the parametric data from the user;
- generating program code based on the customizations to the parametric data, the program code including requirement and checking support code that validates inputs from a user and values that are derived from user entries; and
- publishing the program code and the customized parametric data into the product template.

9. The data processing system of claim 8, wherein the generated program code validates an input from a user.

10. The data processing system of claim 8, wherein the generated program code reads a current value from one of the part components and displays the value in a dialog element.

11. The data processing system of claim 8, the data processing system further configured to perform the step of:
- displaying in a graphical viewer a three-dimensional model of the selected part.

12. The data processing system of claim 8, wherein the product template is configured to allow a user to:
- retrieve the product template;
- edit parameters of the product template; and
- use the product template to create an assembly of parts based on the product template and the edited parameters.

13. The data processing system of claim 8, wherein the connections between the part components comprise at least one of a static connection and a dynamic connection.

14. The data processing system of claim 8, wherein the product template is a parent template and the parent template comprises a child template.

15. A computer program product in a non-transitory machine readable medium for creating a configurable product template to be used in a computer aided design (CAD) environment, the machine-readable medium encoded with computer-executable instructions that when executed cause a data processing system to perform the steps of:
- receiving a user selection of one of a plurality of parts to be developed into a product template;
- receiving data about the selected part, the data including a plurality of part components;
- displaying parametric data relating to the part components and connections between the part components;
- receiving customizations to the parametric data from the user;
- generating program code based on the customizations to the parametric data, the program code including requirement and checking support code that validates inputs from a user and values that are derived from user entries; and
- publishing the program code and the customized parametric data into the product template.

16. The computer program product of claim 15, wherein the generated program code validates an input from a user.

17. The computer program product of claim 15, wherein the generated program code reads a current value from one of the part components and displays the value in a dialog element.

18. The computer program product of claim 15, the tangible machine-readable medium further encoded with computer-executable instructions for:
- displaying in a graphical viewer a three-dimensional model of the selected part.

19. The computer program product of claim 15, wherein the product template is configured to allow a user to:
- retrieve the product template;
- edit parameters of the product template; and
- use the product template to create an assembly of parts based on the product template and the edited parameters.

20. The computer program product of claim 15, wherein the product template is a parent template and the parent template comprises a child template.

* * * * *